No. 619,344. Patented Feb. 14, 1899.
J. M. PYOTT, Jr.
RACK FOR CYCLES.
(Application filed Jan. 19, 1898.)
(No Model.)
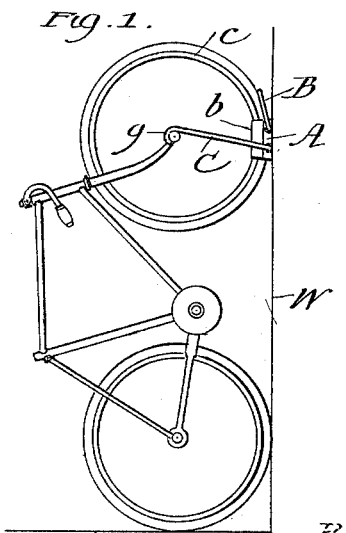
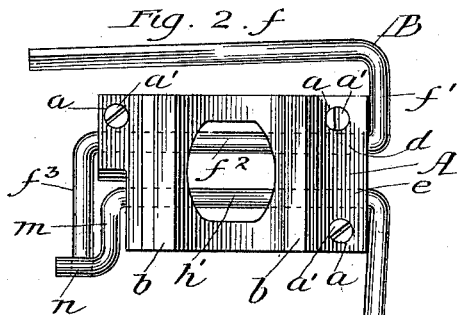
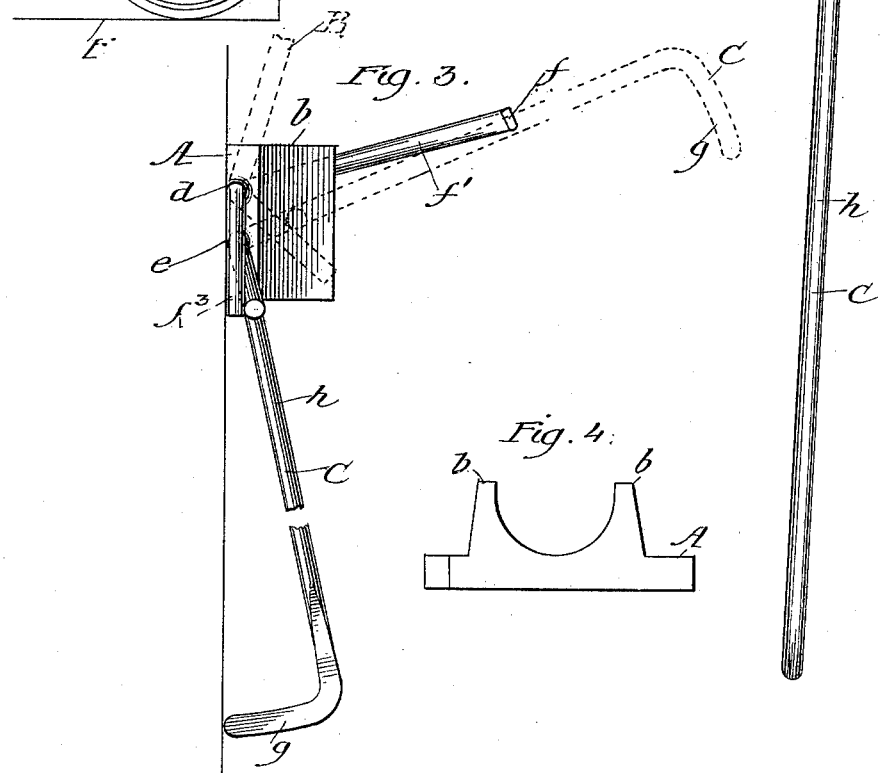
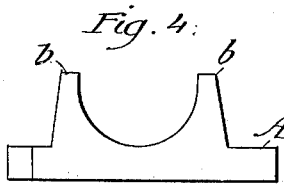
Witnesses:
Frank S. Blanchard
Jerome E. Palmer
Inventor
James M. Pyott Jr
By Attorney
Jesse Cox

UNITED STATES PATENT OFFICE.

JAMES M. PYOTT, JR., OF CHICAGO, ILLINOIS.

RACK FOR CYCLES.

SPECIFICATION forming part of Letters Patent No. 619,344, dated February 14, 1899.

Application filed January 19, 1898. Serial No. 667,130. (No model.)

*To all whom it may concern:*

Be it known that I, JAMES M. PYOTT, Jr., a citizen of the United States, residing in the city of Chicago, in the county of Cook and State of Illinois, have invented a new and useful Improvement in Racks for Cycles, of which the following is a specification.

My invention relates to improvements in racks for holding cycles when not in use; and the objects of my invention are, first, to provide a rack having a swinging arm, with means thereon adapted to engage with the hub of the cycle, and, second, to provide a means whereby said hooked arm is automatically swung into position to engage with said hub. I attain these objects by the mechanism shown in the accompanying drawings, in which—

Figure 1 represents a bicycle held in a vertical position with the swinging hooked arm engaged with the hub of the cycle. Fig. 2 shows a front view of the rack with the swinging hooked arm depending. Fig. 3 is a side view of the device, showing the plate attached to an upright surface, with the hooked arm depending in full lines and the said arm raised in dotted lines. Fig. 4 is an end view of the flanged plate.

Similar letters refer to similar parts throughout the several views.

In the drawings, A represents a plate, preferably of metal, with screw-holes $a\ a$ therein, whereby the same may be attached to a wall, floor, or any other object having a flat surface by the screws $a'\ a'$. Said plate A bears upon its face two flanges $b\ b$, preferably rounded at their base and placed at a sufficient distance from each other to form a rounded groove to receive the rim $c$ of the wheel of the cycle. Said plate A has on its reverse side two rounded grooves $d$ and $e$ to receive and form bearings for the arms B and C, respectively. The arm B is bent into four parts $f$, $f'$, $f^2$, and $f^3$, parts $f$ and $f^2$ being parallel to each other and at right angles to part $f'$. When the plate A is fastened to a wall or other object, part $f^2$ is held by the groove $d$ in the plate A, said groove $d$ forming a bearing for said arm B, in which said arm can rotate. Part $f^3$ of said arm B is at right angles to part $f^2$ and extends in a direction which would result from a forward revolution of about one hundred degrees from the plane determined by parts $f$, $f'$, and $f^2$. The arm C has a long straight part $h$ and is bent at substantially right angles to its own length, so as to form a hook $g$ at its outer extremity. At its inner extremity said arm C is bent at right angles, as shown at $h'$, to rest in the groove $e$, in which said arm rotates. Said arm C is again bent at the extremity of the part $h'$, beyond said plate A and opposite to the long part $h$ of arm C, to form a crank $m$ and crank-pin $n$. All said bent parts $h$, $h'$, $m$, and $n$ of the arm C lie in the same plane. The part $f^3$ of the arm B is of sufficient length to engage with the under portion of the crank-pin $n$ of the arm C.

The operation of my device is as follows: When the plate A is attached to a vertical object, as shown in Fig. 1, in which figure W represents a vertical wall and F a horizontal floor, and the rack is not in use, the long part $h$ of the arm C will depend and lie close to the wall to which said plate A is attached, and the part $f$ of the arm B will stand out in front of the plate A, so that the part $f'$ will stand at an angle of about ten degrees above the horizontal. The rim $c$ of the cycle-wheel is then pressed against the part $f$ of the arm B, causing it to rotate upward until the rim $c$ of the cycle-wheel comes in contact with the plate A within the groove formed by the flanges $b\ b$. This rotation of the part $f$ will rotate upwardly the part $f^3$ of the arm B, and the said part $f^3$, engaging with the crank-pin $n$ of the crank $m$, will rotate said crank $m$ and cause the long part $h$ of the arm C to assume a horizontal position. The outer extremity of the arm C is then grasped by the operator and the hook $g$ is pressed over the hub of one of the cycle-wheels, whereby the cycle is held firmly in a vertical position with the other of its wheels resting on the floor. By reason of the arm $h$ being lifted to a horizontal position the operator is not obliged to reach to the wall alongside the cycle in order to reach said arm.

It is obvious that without departing from my invention the angles of the parts $f^3$ and of the crank-arm $m$ and pin $n$ of the arm C may be changed and the same result produced as I have described so long as the relations of said parts are not changed and the part $h$ of the arm C is allowed to depend when the device is not in use and is lifted so as to stand horizontally when the part $f$ is rotated upward.

It is also obvious that instead of being attached to a vertical object the plate A may be attached to a horizontal object and my device still be operated successfully to retain the cycle without departing from my invention.

What I claim as new, and desire to secure by Letters Patent, is—

1. A rack for cycles, wherein is combined a swinging arm, having a hook at its outer extremity, and bent at its inner extremity to form a hinge, and having a crank thereon; a hinged actuating-arm, having a part at right angles to the length of said hooked arm, and another part parallel therewith, and forming a hinge for said actuating-arm, and a part beyond said hinge, engaging with said crank on said hooked arm to actuate the same, and means to detain the wheel of the cycle, substantially as described.

2. A rack for cycles, wherein is combined a swinging arm having a hook at its outer extremity, and bent at its inner end to form a hinge, and having a crank thereon: a hinged actuating-arm, having a part at right angles to the length of said hooked arm, and another part parallel therewith, and forming a hinge for said actuating-arm, and a part beyond said hinge engaging with said crank on said hooked arm, to actuate the same; a plate having on its front side a groove to receive the rim of a cycle-wheel, and on its reverse side, grooves to form bearings for said arms: all substantially as described.

JAMES M. PYOTT, JR.

Witnesses:
JESSE COX,
ARTHUR M. COX.